(12) United States Patent
Coutts

(10) Patent No.: US 9,802,308 B2
(45) Date of Patent: Oct. 31, 2017

(54) RAIL LIGHTING AND LAMP ATTACHMENT FOR AUTOMOTIVE CREEPER

(71) Applicant: Jeremiah Coutts, Centralia, WA (US)

(72) Inventor: Jeremiah Coutts, Centralia, WA (US)

( * ) Notice: Subject to any disclaimer, the term of this patent is extended or adjusted under 35 U.S.C. 154(b) by 34 days.

(21) Appl. No.: 15/043,453

(22) Filed: Feb. 12, 2016

(65) Prior Publication Data
US 2017/0232608 A1  Aug. 17, 2017

(51) Int. Cl.
| | |
|---|---|
| *B60Q 3/00* | (2017.01) |
| *B25H 5/00* | (2006.01) |
| *B60Q 1/00* | (2006.01) |
| *B60Q 1/24* | (2006.01) |
| *F21V 17/10* | (2006.01) |
| *F21V 19/02* | (2006.01) |
| *F21V 23/00* | (2015.01) |
| *F21V 33/00* | (2006.01) |
| *F21L 4/02* | (2006.01) |
| *F21Y 115/10* | (2016.01) |
| *F21Y 103/00* | (2016.01) |

(52) U.S. Cl.
CPC .............. *B25H 5/00* (2013.01); *B60Q 1/0076* (2013.01); *B60Q 1/0088* (2013.01); *B60Q 1/24* (2013.01); *F21L 4/02* (2013.01); *F21V 17/105* (2013.01); *F21V 19/02* (2013.01); *F21V 23/001* (2013.01); *F21V 33/00* (2013.01); *F21Y 2103/00* (2013.01); *F21Y 2115/10* (2016.08)

(58) Field of Classification Search
CPC .... B25H 5/00; F21Y 2115/10; F21Y 2103/10; F21Y 2101/00; F21Y 2103/30; F21S 4/20; F21S 4/10; F21S 2/00; F21S 4/28
USPC .......................................................... 362/486
See application file for complete search history.

(56) References Cited

U.S. PATENT DOCUMENTS

| | | | |
|---|---|---|---|
| 5,863,053 A * | 1/1999 | Berry ..................... | B25H 5/00 280/32.6 |
| 5,895,062 A * | 4/1999 | Miles ..................... | B25H 5/00 280/32.6 |
| 2007/0091596 A1* | 4/2007 | Grossman ................ | F21S 2/00 362/217.09 |
| 2013/0201658 A1* | 8/2013 | Bogart .................... | F21S 4/001 362/95 |
| 2013/0235569 A1* | 9/2013 | McGowan .......... | F21V 33/0048 362/223 |
| 2014/0340903 A1* | 11/2014 | Mahr ...................... | F21S 4/10 362/249.08 |
| 2015/0159848 A1* | 6/2015 | Sieberth ................. | F21V 23/06 362/311.02 |

* cited by examiner

*Primary Examiner* — Thien M Le

(57) ABSTRACT

An illumination attachment apparatus for an automotive creeper is disclosed herein. The apparatus includes light sources, a rechargeable power supply source for supplying electric energy to the light sources, wiring for routing the electric energy to the light sources, cables for encasing the wiring, rails having a channel for circumscribing a portion of the creeper, and magnets disposed within each channel for magnetically attaching and detaching the apparatus to the creeper.

16 Claims, 5 Drawing Sheets

RAIL LIGHTING AND LAMP ATTACHMENT FOR AUTOMOTIVE CREEPER

BACKGROUND

1. Field of the Invention

This disclosure relates generally to an attachable, portable, illumination apparatus, and more particularly to embodiments for attaching lighting to creepers which are used by mechanics to gain access to the underbody of a vehicle.

2. Description of the Related Art

A well-known tool used by auto mechanics is a low-profile, wheeled platform, commonly known as a creeper, in which the mechanic may lie supine thereon, in order to look up at and gain better access to the underbody of a vehicle.

Auto mechanics and other tradesmen, technicians, and craftsmen have been seeking improved illumination solutions while using creepers. In addition to improved types of mechanics' lights for illuminating the mechanics' working area, the existence of other types of mechanics' lights are sold as a single unit with the creeper, where the light is integrated into the design of the creeper.

As more and more improvements are made in general to lighting and luminescence, there is a need for such improvements to be energy-saving, sustainable, and applicable to industries that suffer from dimly lit work areas. Thus, an attachable and portable, lighting assembly, which is sold as an off-the-shelf, aftermarket, attachment for retrofitting to existing mechanics' creepers in wide use within the auto mechanic industry, is one such solution.

SUMMARY

The present disclosure is directed to an illumination attachment apparatus for a creeper having a frame and wheeled-platform. The apparatus includes a plurality of light sources, a rechargeable power supply source for supplying electric energy to the plurality of light sources, wiring for routing the electric energy to the plurality of light sources, at least one cable for encasing the wiring, a plurality of rails, each rail of the plurality of rails having a channel for circumscribing at least a portion of the frame of the creeper, and a plurality of magnets disposed within each channel for magnetically attaching and detaching the apparatus to the frame of the creeper.

In different embodiments, the cable includes female and corresponding male housings for connecting or disconnecting the electric energy from the plurality of light sources, one output of the plurality of light sources is emitted from along a length of at least one of the plurality of rails.

In different embodiments, the apparatus includes a head rail for attaching to a head portion of the frame of the creeper, a left mounting rail for attaching to a portion of a left side of the frame of the creeper, and a right mounting rail for attaching to a portion of a right side of the frame of the creeper.

In different embodiments, the apparatus includes light-emitting diodes, which are oriented in series, the magnets are rare earth magnets, the rails are each separable from one another via the cable and the female and male housing of the cable, the rechargeable power source is a battery, and the apparatus includes an electrical switch adapted to control a supply of the electric energy.

In some embodiments, the head rail includes a light-emitting diode lamp having a flexible neck portion.

In some embodiments, the left mounting rail and the right mounting rail each include an opening for housing the cable.

In some embodiments, the head rail, left mounting rail, and right mounting rail each include at least one cut-away for avoiding a fastener of the frame of the creeper.

The present disclosure is also directed, in part, to an attachment apparatus configured to be fitted to a head section and first and second opposed sides of an automotive creeper. In an embodiment, the apparatus includes a first generally S-shaped member having a first three-walled, two-cornered section and a second three-walled, two-cornered section with one wall in common between the two sections, the first three-walled section forming a channel for circumscribing a portion of the first of the opposed sides of the creeper; a second generally S-shaped member in the mirror image of the first S-shaped member having a first three-walled, two-cornered section and a second three-walled, two-cornered section with one wall in common between the two sections, the first three-walled section forming a channel for circumscribing a portion of the second of the opposed sides of the creeper; a generally C-shaped member and a flange member joined to one side of the C-shaped member forming two, adjacently oriented, three-walled, two-cornered sections with one wall in common between the two sections, and one of the three-walled sections forming a channel for circumscribing a portion of the head section of the creeper; a series of light-emitting diodes disposed between a pair of opposed walls within the second three-walled section of the first S-shaped member thereby forming a tunnel within the second three-walled section of the first S-shaped member, and a series of light-emitting diodes disposed between a pair of opposed walls within the second three-walled section of the second S-shaped member thereby forming a tunnel within the second three-walled section of the second S-shaped member; a light-emitting diode lamp having a flexible neck portion attached to the flange member; a plurality of magnets disposed within each channel of each S-shaped member and the C-shaped member for magnetically attaching and detaching the apparatus to the creeper.

In some embodiments, the first three-walled section of the first S-shaped member, the first three-walled section of the second S-shaped member, and one of the three-walled sections forming a channel for circumscribing a portion of the head section of the creeper of the C-shaped member, each include at least one cut-away for avoiding a fastener on the creeper.

It should be understood that the summary above is provided to introduce in simplified form a selection of examples that are further described in the detailed description. It is not meant to identify key or essential features of any claimed subject matter that may later claim priority to the present description. Furthermore, the scope of any such claimed subject matter would not be limited to implementations that solve any disadvantages noted above or herein contained.

BRIEF DESCRIPTION OF THE DRAWINGS

Many aspects of the present invention can be better understood with reference to the following drawings. The components in the drawings are not necessarily to scale. Emphasis instead, being placed upon clearly illustrating the principles of the present invention. Moreover, in the drawings, like reference numerals designate corresponding parts throughout the several views.

DETAILED DESCRIPTION

Figure 1:
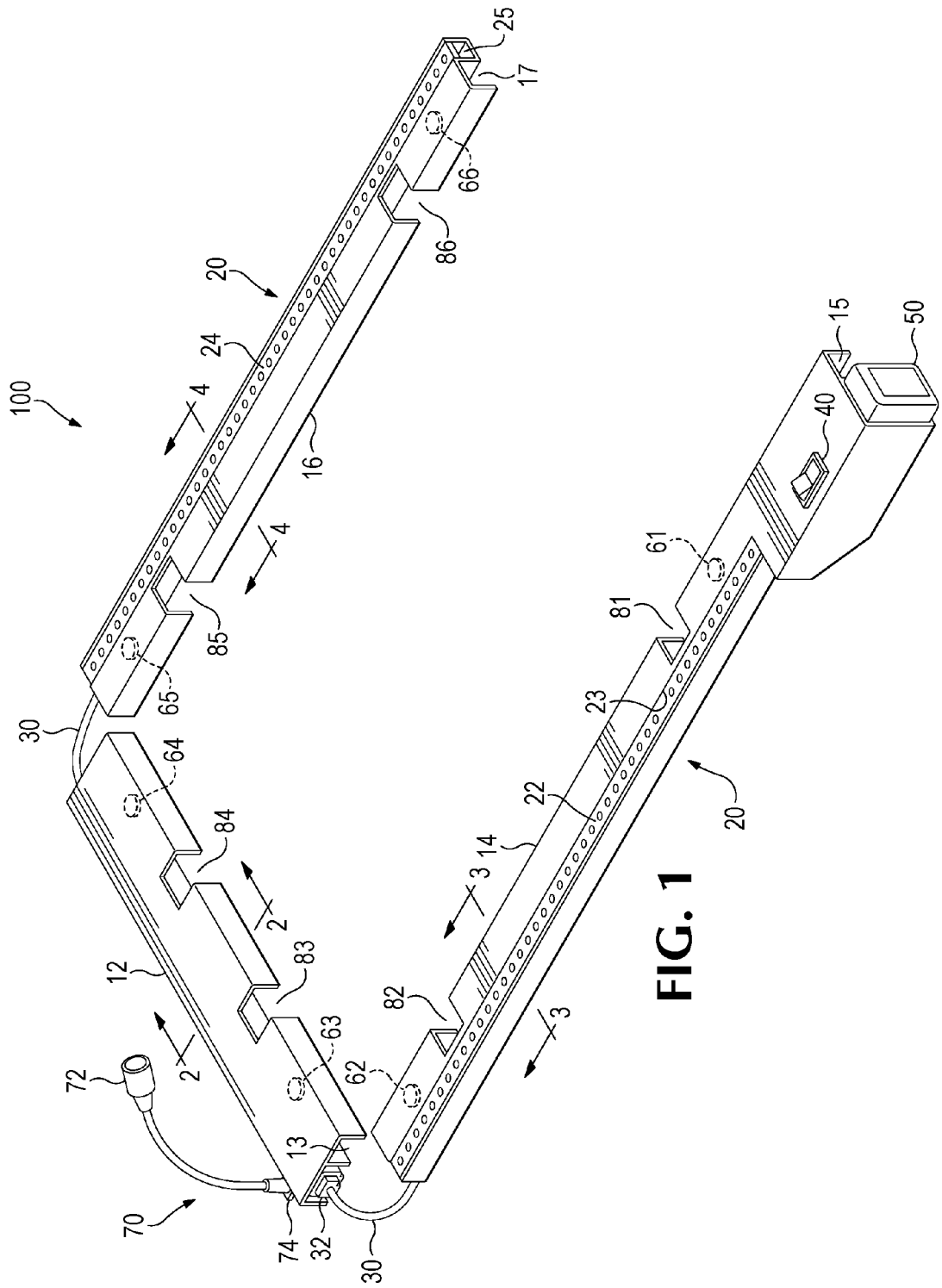
FIG. 1 is an isometric view of an example of a rail lighting and lamp attachment, according to embodiments of the invention.

The term creeper or mechanic's creeper shall mean a low-profile, wheeled platform or trolley, commonly used in the auto mechanic industry for access to the underbody of a vehicle. Widely-used creepers intended to be covered by the term as used herein, are typically constructed with a support structure, frame, or railings in an open-ended rectangular shape, or in which the structure, frame, or railing have at least three sides, two of which are disposed parallel to one another.

The terms LED(s), LED array(s), and LED lamp shall mean a light-emitting diode having a two-lead semiconductor light source and a suitable voltage to thereby effect electroluminescence. The terms are taken to mean high-power, white-light LEDS and other light colors for the purpose of illumination, in replacement of incandescent and fluorescent light. The terms are also meant to include the different lenses, types of lenses, or other transparent materials that are commonly configured to house the light source and enhance focus of the projection of the light emitted.

The term magnet or magnets shall mean magnets known as neodymium and samarium-cobalt, which are made from alloys of rare earth elements and plated or coated for protection, or other known magnets that may have relatively weaker magnetic fields, such as ferrite and ceramic magnets. The magnets can be shaped in any form, such as, for example, a disc.

Unless limited otherwise, the terms "coupled," "attached," and variations thereof herein are used broadly and encompass direct and indirect arrangements. The terms "a" and "an" herein do not denote a limitation of quantity, but rather denote the presence of at least one of the referenced items.

Non-limiting embodiments will now be described in detail, by way of example, with reference to the drawings, where like reference numerals represent like parts throughout the various drawing figures.

The present disclosure provides a rail lighting and lamp attachment 100 to be utilized with a vehicle maintenance platform or mechanic's creeper C. The attachment 100 is configured to be attachable to the railing of widely used creepers C. The light source 20 is configured to attach to the side rails of the creeper C. Wiring 30 electrically connects the attachment's 100 rails or railing 10 to one another, providing an electrical pathway 90 for operation. Light source 20 is powered by a rechargeable power source 50, having an on/off switch 40. Magnets 60 are disposed on the underside of the railing 10 to allow the railing 10 to slip-fit on the creeper's C side rails and head rail.

Referring to FIG. 1, an isometric view of an exemplar rail lighting and lamp attachment 100 for a vehicle maintenance platform C according to different embodiments of the present disclosure is shown. The railing sections 10 of the lighting attachment 100 are separable for portability and re-attachable for operation. The rails or railing 10 include a head rail 12, left mounting rail 14, and right mounting rail 16. The three rails 12, 14, and 16 each include a channel 13, 15, and 17 on the underside (see FIGS. 2-4 and 6 for channels 13, 15, and 17) for coupling to the corresponding rail of the creeper C (see FIG. 5 for use with creeper C). It should be understood persons of ordinary skill in the art that the rails 10 are constructed from any suitable material that is durable and formable in its shape to slip-fit over common, widely used creepers C and creeper railings. Such materials include, by way of example, aluminum, stainless steel, galvanized steel or blends thereof.

With continuing reference to FIG. 1, the light sources 20 (generally) can be disposed on the left mounting rail 14 and right mounting rail 16 in a serial manner. The light sources 20 are configured to target regions underneath the vehicle for illumination and arranged such that light emitted from the light sources 20 is projected towards the target region. In one embodiment of the present disclosure, the light sources 20 may be Light Emitting Diodes (LEDs) arranged as an LED array (left array 22 and right array 24) on each side of the attachment 100. It should be apparent to persons of ordinary skill in the art that various other light sources besides LEDs may be utilized.

Figure 2:
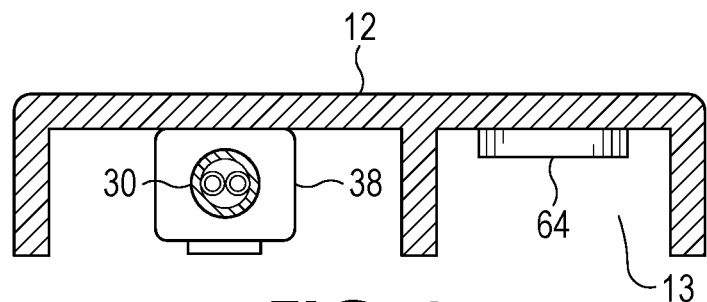
FIG. 2 is an end view of an example of a head rail of the rail lighting and lamp attachment shown in FIG. 1, according to embodiments of the invention.
Figure 3:
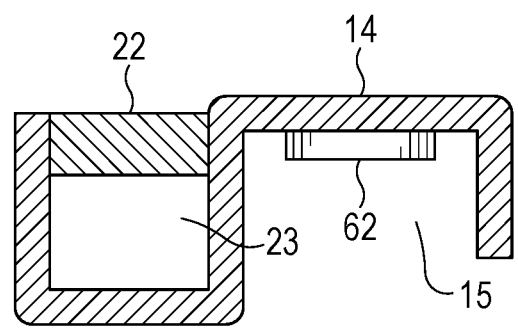
FIG. 3 is an end view of an example of a left mounting rail of the rail lighting and lamp attachment shown in FIG. 1, according to embodiments of the invention.
Figure 4:
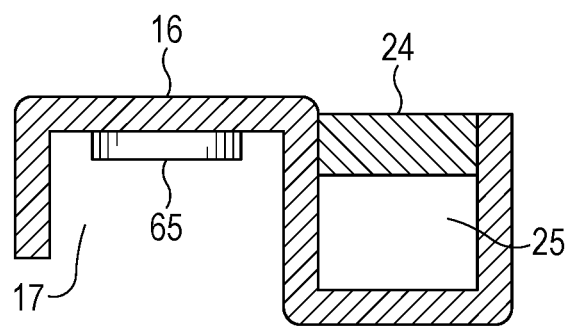
FIG. 4 is an end view of an example of a right mounting rail of the rail lighting and lamp attachment shown in FIG. 1, according to embodiments of the invention.

Now, with reference to FIGS. 2-4, end views of each of the rails 10 are shown. In FIG. 2, head rail 12 is shown with channel 13 and magnet 64 (to be described later) for attachment to a head rail portion of the creeper C. Next, FIG. 3 shows the LED left array 22 of the left mounting rail 14. Also illustrated are channel 15 and magnet 62 (to be described later) for attachment to a left side rail portion of the creeper C. Similarly, in FIG. 4, LED right array 24 of the right mounting rail 16, as well as channel 17 and magnet 65 (to be described later) for attachment to a right side rail portion of the creeper C are shown. Tunnels 23 and 25 are openings provided on the underside of the LED arrays 22 and 24, respectively, with particular reference to FIGS. 3 and 4.

Figure 5:
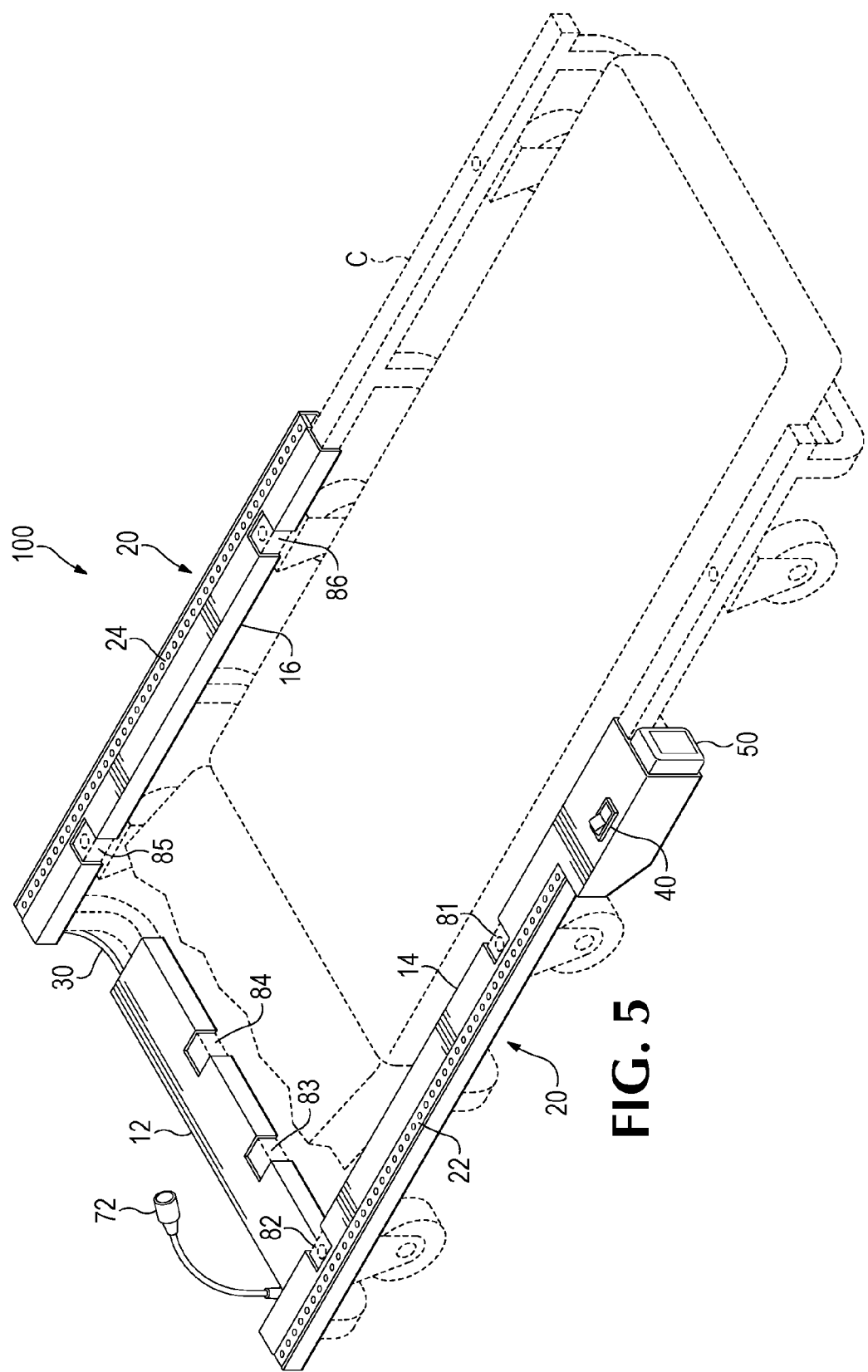
FIG. 5 is an isometric view of an example of the rail lighting and lamp attachment shown in FIG. 1, as attached to a creeper for operation, according to embodiments of the invention.
Figure 6:
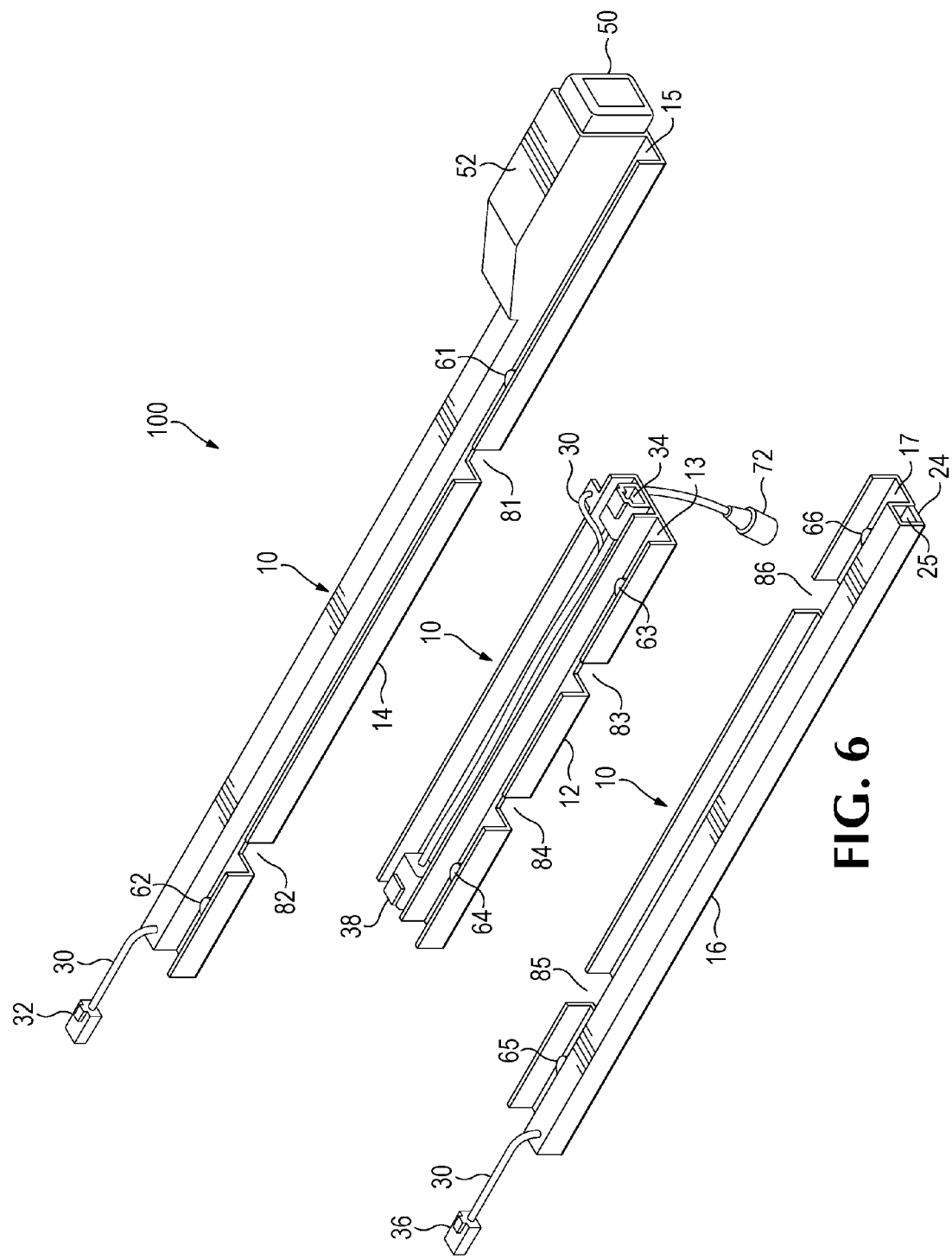
FIG. 6 is an isometric, bottom view of an example of the rail lighting and lamp attachment shown in FIG. 1, as disconnected, according to embodiments of the invention.

In a non-limiting embodiment, with continuing reference to FIG. 2 and now with reference to FIG. 6, wiring 30 of the rail lighting and lamp attachment 100 are described. Male connectors 32, 36 and corresponding female connectors 34, 38 of the wiring 30 are, by way of example, a type of male-female connector and wiring known as Deutsch connectors and Deutsch wiring from Deutsch Industrial Products Division. Any type of push-pull configuration connectors are contemplated by the present disclosure. During operation, the wiring 30 and connectors 32, 34, 36, 38 help complete the electrical pathway 90 (to be described later) when properly connected together and positioned on the creeper C (see FIG. 5 for use with creeper C). On the other hand, the wiring 30 and connectors 32, 34, 36, 38 when disconnected separate each of the three rails 10 from one another for portability. Further, it is contemplated by the present discourse that the push-pull type connectors of the attachment 100 can be used to connect with a printed circuit board (PCB). The present disclosure, however, is not limited by the type or brand of connectors and wiring, so long as there are pins or lead wires or other contacts available for completion of the electrical pathway 90 and for connection with a PCB.

In another embodiment of the disclosure, power source 50 is coupled to the light source 20 (as depicted in FIGS. 1, 5, 6, and 7). The power source 50 is coupled to the left array 22 and left mounting rail 14, in a non-limiting embodiment. It should be apparent to persons of ordinary skill in the art that power source 50 can be coupled to any one of the rails 10.

Examples of the power source 50 may include, but are not limited to, a rechargeable battery. The battery 50 can be nickel cadmium, nickel-metal hydride, lithium-ion, or the like. In one embodiment of the disclosure, the battery 50 may have a voltage of about 12 volts. However, it should be apparent to a person skilled in the art that batteries with different voltage may also be utilized as the power source 50. Further, the power source 50 may be recharged to a desired voltage level when required. In addition, the power source 50 may be connected to an external power source such as a wall socket through a power supply port (not shown), for charging to the power source 50 to the desired voltage level.

Power source 50 is housed within battery box 52. Battery box 52 can be formed as part of the rails 10 or attached with a threaded screw to any one of the rails 10. It should be apparent to a person of ordinary skill in the art that the power source 50 may be coupled/housed/attached at various other positions of the attachment's general structure and design 100.

In continuing reference to FIGS. 1, 5, 6, and 7, battery 50 is electrically connected to the light sources 20 through an internal wiring 30 and push-pull plug connectors 32 to 34 and 36 to 38. In addition, attachment 100 includes an electrical switch 40 configured to activate/deactivate the light sources 20. Specifically, when the electrical switch 40 is in an 'ON' state, the power source 50 and light sources 20 (and LED lamp 70, to be described later) are electrically connected to the electrical pathway 90 (to be described later). Further, when the electrical switch 40 is in an 'OFF' state, the power source 50 and the light sources 20 (and LED lamp 70) are disconnected from the electrical pathway 90.

In a non-limiting embodiment, the attachment 100 is capable of being attachable, detachable, and re-attachable to the creeper C. As illustrated in FIGS. 1-4 and 6, a known type of coupling mechanism may include one or more rare earth magnets 60. Turning to FIGS. 1 and 6 specifically, magnets 61, 62, 63, 64, 65, and 66 are disposed in pairs on each rail's 10 channel-side. The present disclosure contemplates various other coupling mechanisms which may be utilized for coupling the attachment 100 to the creeper C, apart from utilizing magnets 60.

Referring to reference numeral labels 70, 72, and 74, throughout the various drawings as illustrated, a gooseneck 72 type LED lamp 70 is positioned on head rail 12 to provide another more focused, repositionable light source 70. The gooseneck 72 can be about 18 inches in length. Those of skill in the art will appreciate that any suitable lamp alternative is contemplated as being within the spirit and scope of the invention.

As disclosed above, the attachment 100 is configured to be detachably coupled to the creeper C. In particular, the rail lighting and lamp attachment 100 is detachably coupled to a conventional creeper C. Accordingly, in a non-limiting embodiment of the present disclosure, the left mounting rail 14 and right mounting rail 16 are about 24 inches in length. Battery box 52 is about 6 inches in length. The head rail 12 is about 12 inches in length. Those of skill in the art will appreciate that alternative dimensions for the railing 10 are contemplated as being within the spirit and scope of the invention.

The shape of the rails 10 as illustrated in FIGS. 2-4, are configure such that in coupling to the creeper C, head rail 12, left mounting rail 14, and right mounting rail 16 circumscribe a portion of the creeper's C support structure, frame, or rails (see FIG. 5 for use with creeper C). Referring to FIG. 2, head rail 12, in a non-limiting embodiment, can be formed from two-piece, angle welded, C-channel or U-channel metal, for example. Left mounting rail 14, and right mounting rail 16 can be formed each from single-piece, folded sheet metal having positive and negative bend angles, such that the natural side includes the wide bend that forms openings 15 and 17, as illustrated in FIGS. 3 and 4. However, railing 10 (generally) may have other shapes as appropriate, depending upon the shape of the creeper C. It should be understood by those of ordinary skill in the art, head rail 12, left mounting rail 14, and right mounting rail 16 are formed, welded, and/or bended in order for the attachment 100 to be attachable, detachable, and re-attachable to the creeper C.

As illustrated in FIGS. 1, 5 and 6, cut-away portions 80, allow the attachment 100 to slip-fit on the creeper C by avoiding widely-used creeper's C caster-wheel mounts (broken lines). Cut-away portions 81, 82, 83, 84, 85, and 86, as shown, allow the attachment 100 to mate with the creeper C, despite the creeper's C caster-wheel mounts (broken lines). Those of skill in the art will appreciate that suitable cut-away 80 configuration alternatives are contemplated as being within the spirit and scope of the invention.

Figure 7:
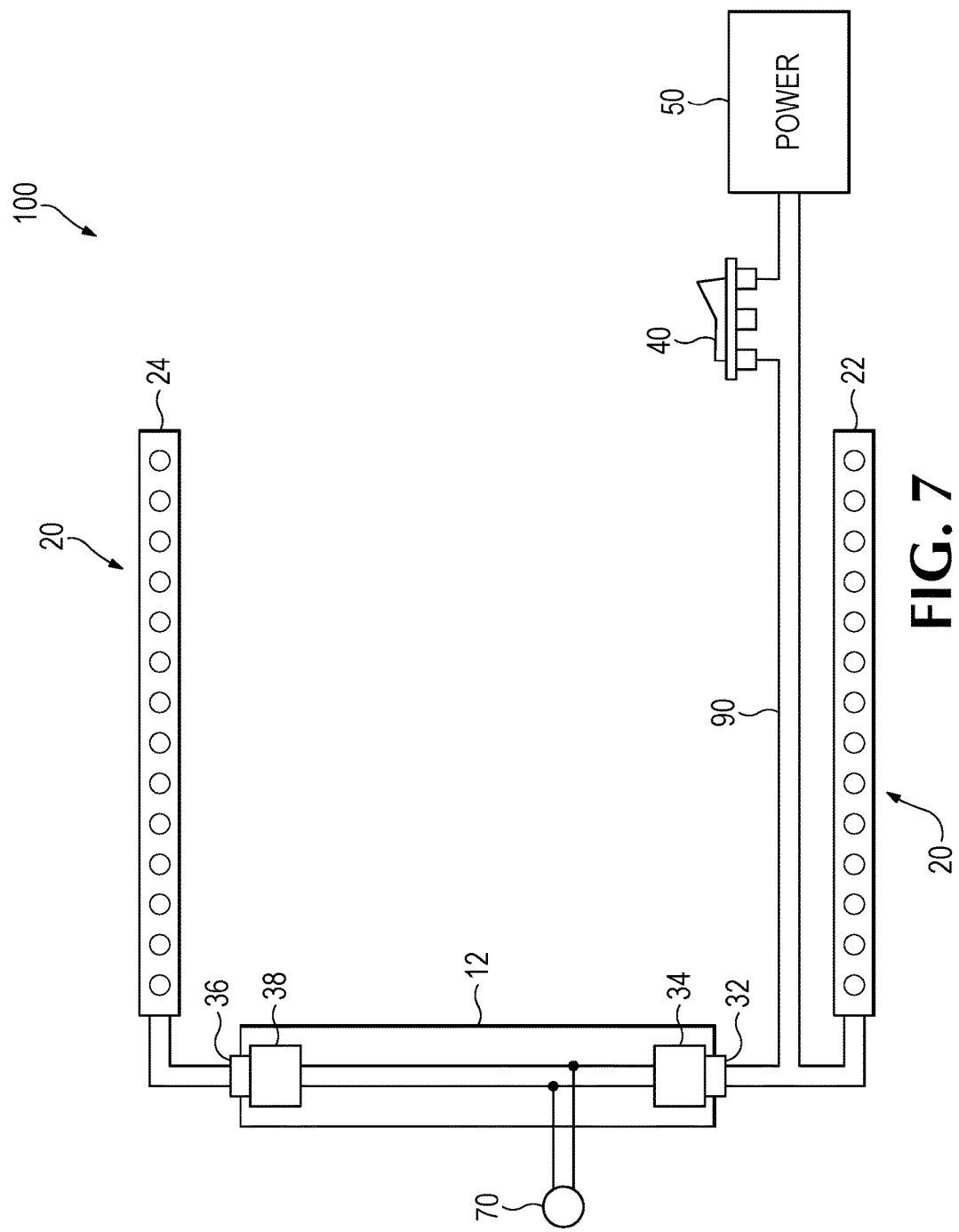
FIG. 7 is a top plan view of an example of an electrical pathway of the rail lighting and lamp attachment shown in FIG. 1, according to embodiments of the invention.

With reference to FIG. 7, attachment 100 includes electrical pathway 90, in which the power 50 is directed to the light sources 20, 70 via the wiring 30.

From the foregoing description it will be apparent that modifications can be made to the rail lighting and lamp attachment 100 without departing from the teachings of the invention.

The instant invention may be embodied in other forms or carried out in other ways without departing from the spirit or essential characteristics thereof. The present disclosure is therefore to be considered as in all respects illustrative and not restrictive, the scope of the invention being indicated by the appended claims, and all equivalency are intended to be embraced therein. One of ordinary skill in the art would be able to recognize equivalent embodiments of the instant invention and be able to practice such embodiments using the teaching of the instant disclosure and only routine experimentation.

What is claimed is:

1. An illumination attachment apparatus for a creeper having a frame and wheeled-platform, comprising:
    a plurality of light sources;
    a rechargeable power supply source for supplying electric energy to the plurality of light sources;
    wiring for routing the electric energy to the plurality of light sources;
    at least one cable for encasing the wiring, the cable having female and corresponding male housings for connecting or disconnecting the electric energy from the plurality of light sources;
    a plurality of rails, each rail of the plurality of rails having a channel for circumscribing at least a portion of the frame of the creeper; and, a plurality of magnets disposed within each channel of each rail of the plurality of rails for magnetically attaching and detaching the apparatus to the frame of the creeper, wherein at least one output of the plurality of light sources is emitted from along a length of at least one of the plurality of rails.

2. The apparatus of claim 1, wherein the plurality of rails comprises a head rail for attaching to a head portion of the frame of the creeper, a left mounting rail for attaching to a portion of a left side of the frame of the creeper, and a right mounting rail for attaching to a portion of a right side of the frame of the creeper.

3. The apparatus of claim 1, wherein the plurality of light sources are light-emitting diodes.

4. The apparatus of claim 1, wherein the plurality of light sources are light-emitting diodes in series.

5. The apparatus of claim 1, wherein the plurality of magnets are rare earth magnets.

6. The apparatus of claim 1, wherein the plurality of rails are each electrically connectable to and each separable from one another by way of connecting and disconnecting the female and male housing of the cable.

7. The apparatus of claim 1, wherein the rechargeable power source is a battery.

8. The apparatus of claim 1, further comprising an electrical switch adapted to control a supply of the electric energy from the rechargeable power source to the light source.

9. The apparatus of claim 2, wherein the head rail includes a light-emitting diode lamp having a flexible neck portion.

10. The apparatus of claim 2, wherein the left mounting rail and the right mounting rail each include an opening for housing the at least one cable.

11. The apparatus of claim 2, wherein the head rail, left mounting rail, and right mounting rail each include at least one cut-away for avoiding a fastener of the frame of the creeper.

12. An attachment apparatus configured to be fitted to a head section and first and second opposed sides of an automotive creeper, the apparatus comprising:

a first generally S-shaped member having a first three-walled, two-cornered section and a second three-walled, two-cornered section with one wall in common between the two sections, the first three-walled section forming a channel for circumscribing a portion of the first of the opposed sides of the creeper;

a second generally S-shaped member in the mirror image of the first S-shaped member having a first three-walled, two-cornered section and a second three-walled, two-cornered section with one wall in common between the two sections, the first three-walled section forming a channel for circumscribing a portion of the second of the opposed sides of the creeper;

a generally C-shaped member and a flange member joined to one side of the C-shaped member forming two, adjacently oriented, three-walled, two-cornered sections with one wall in common between the two sections, and one of the three-walled sections forming a channel for circumscribing a portion of the head section of the creeper;

a series of light-emitting diodes disposed between a pair of opposed walls within the second three-walled section of the first S-shaped member thereby forming a tunnel within the second three-walled section of the first S-shaped member, and a series of light-emitting diodes disposed between a pair of opposed walls within the second three-walled section of the second S-shaped member thereby forming a tunnel within the second three-walled section of the second S-shaped member;

a light-emitting diode lamp having a flexible neck portion attached to the flange member;

a plurality of magnets disposed within each channel of each S-shaped member and the C-shaped member for magnetically attaching and detaching the apparatus to the creeper.

13. The apparatus of claim 12, wherein the plurality of magnets are rare earth magnets.

14. The apparatus of claim 12, further comprising a rechargeable battery electrically connected to light-emitting diodes for supplying electric energy to the light-emitting diodes.

15. The apparatus of claim 12, further comprising an electrical switch adapted to control a supply of the electric energy from the battery to the light-emitting diodes.

16. The apparatus of claim 12, wherein the first three-walled section of the first S-shaped member, the first three-walled section of the second S-shaped member, and the one of the three-walled sections forming a channel for circumscribing a portion of the head section of the creeper of the C-shaped member, each include at least one cut-away for avoiding a fastener on the creeper.

* * * * *